Nov. 13, 1956 R. J. MUELLER 2,770,394
METHOD AND APPARATUS FOR DISPENSING A MEASURED
AMOUNT OF BEVERAGE INGREDIENTS
Filed May 4, 1954 2 Sheets-Sheet 1
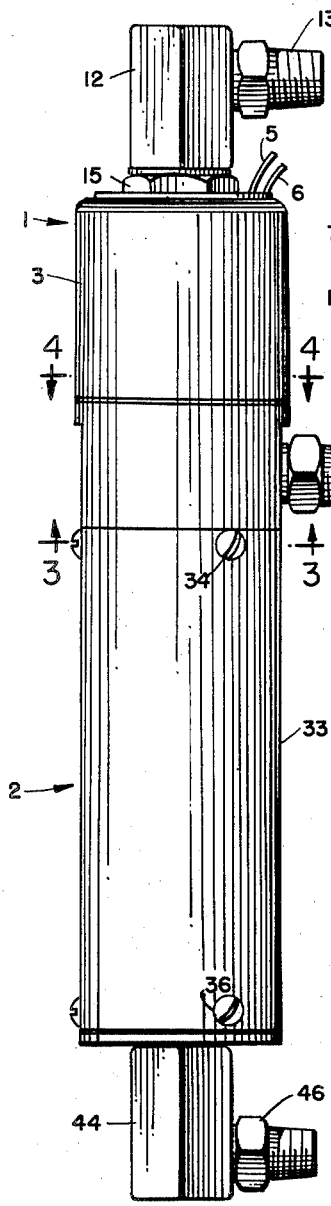
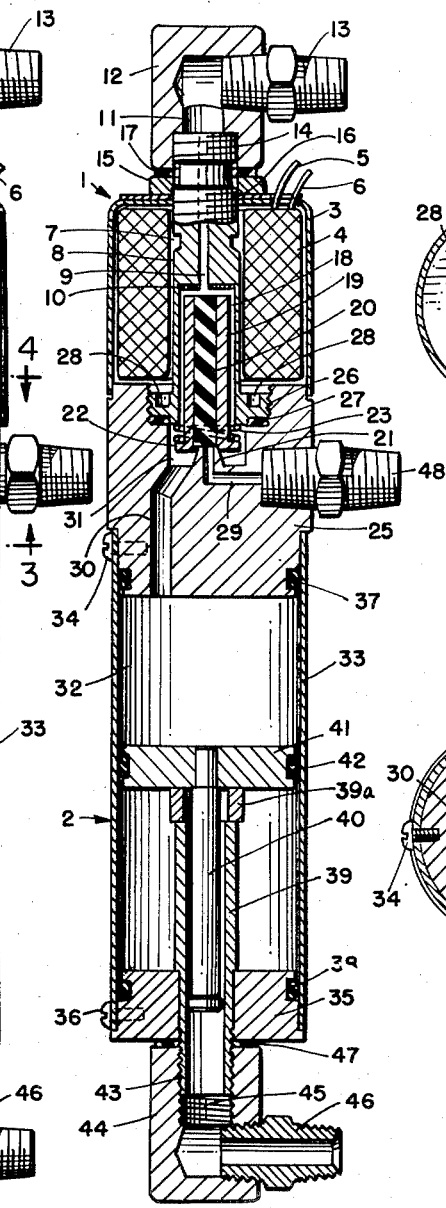
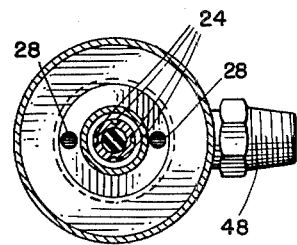
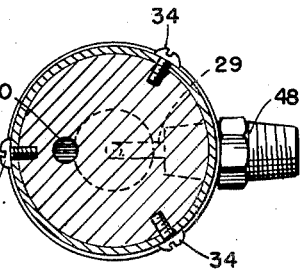
INVENTOR:
RICHARD J. MUELLER
BY Marzall, Johnston,
Cook & Root
ATT'YS

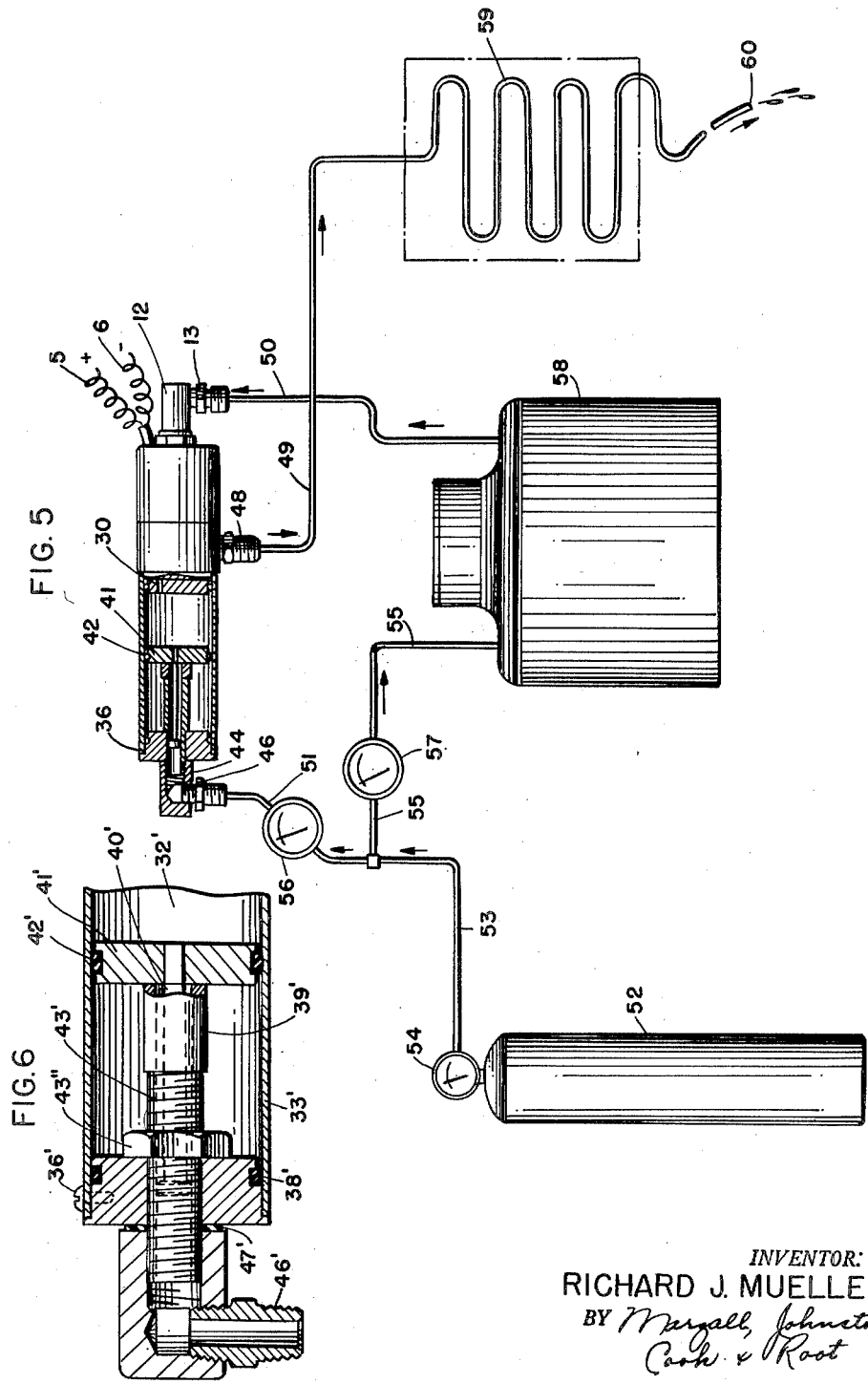

United States Patent Office 2,770,394
Patented Nov. 13, 1956

2,770,394

METHOD AND APPARATUS FOR DISPENSING A MEASURED AMOUNT OF BEVERAGE INGREDIENTS

Richard J. Mueller, Franklin Park, Ill., assignor to Automatic Canteen Company of America, Inc., Chicago, Ill., a corporation of Delaware Application May 4, 1954, Serial No. 427,469

9 Claims. (Cl. 222—1)

This invention relates to a method and apparatus for dispensing a measured amount of beverage ingredients and more particularly to a method and apparatus for dispensing a measured amount of syrup in the preparation of mixed carbonated drinks in a beverage vending machine.

One of the objects of the invention is to provide a new and improved apparatus for measuring and dispensing a measured amount of syrup in a carbonated beverage vending machine.

Another object of the invention is to provide a new and improved method for utilizing the carbon dioxide pressure in a carbonated beverage vending machine in order to measure and dispense a measured amount of syrup which is subsequently mixed with carbonated water in the machine to prepare a mixed carbonated drink.

A further object of the invention is to provide a new and improved positive displacement method and apparatus for measuring and dispensing a measured amount of a syrup in a carbonated beverage vending machine.

Another object of the invention is to provide a simplified method and apparatus for measuring and dispensing a measured amount of syrup in a carbonated beverage vending machine.

Another object of the invention is to provide a new and improved positive displacement measuring and dispensing device which utilizes gas pressure in its operation.

Other objects and advantages of the invention will be apparent by reference to the following description in conjunction with the accompanying drawings, in which—

Fig. 1 is an elevational view of a measuring and dispensing device provided in accordance with the invention;

Fig. 2 is a cross section taken vertically through the center of Fig. 1;

Fig. 3 is a cross section taken along the line 3—3 of Fig. 1;

Fig. 4 is a cross section taken along the line 4—4 of Fig. 1;

Fig. 5 is a diagrammatic view illustrating the use of the dispensing and measuring device of Fig. 1 and its operation in a carbonated beverage vending machine, and Fig. 6 is an enlarged modified view of one end of the measuring and dispensing device illustrating means for changing the size of the measuring chamber.

The measuring and dispensing device illustrated in Figs. 1 and 2 comprises a solenoid valve member generally shown at 1 and a cylindrical measuring and dispensing unit generally shown at 2. The solenoid valve member 1 consists of an outer shell or housing 3 which houses an annular electrical coil 4 forming the electromagnet of the solenoid and connected by means of suitable wires 5 and 6 to a source of electricity. The electrical coil 4 is provided with a centrally located passageway 7 adapted to receive a tubular member 8 which has a bore 9 extending therethrough from end to end and terminating at the inner end in a valve seat 10.

The outer end of the bore 9 opens into a passageway 11 in nipple 12 which is threadedly connected to a fitting 13. The nipple 12 is also threadedly connected to the outer end of the tubular member 8 by screw threads 14. The housing 3 is held in place by means of a nut 15 threadedly engaging threads 16 on the outer surface of tubular member 8.

A fluid tight seal is provided by a washer 17 made of rubber, or other suitable material, which is disposed between the nut 15 and the nipple 12. The lower part of the tubular member 8 is provided with an enlarged passageway 18 adapted to receive the solenoid plunger or piston member 19, the outer part of which is constructed of metal or other suitable material capable of being attracted electromagnetically. The central portion of the solenoid member 19 consists of a solid cylinder of rubber 20 which is adapted to seat at one end on the seat 10 and at the other end on the frusto-conical valve seat 21. The lower end of the solenoid plunger 19 is provided with a flange 22 which extends outwardly and is adapted to hold coil spring 23. The coil spring 23 is seated between the flange 22 and the lower end of the tubular member 8.

Four grooves 24 are provided in the sides of the solenoid plunger 19 in order to facilitate movement of the solenoid plunger and the passage of fluids.

The tubular member 8 is threadedly connected to a metal block 25 by means of threads 26 and a fluid tight seal is provided by an annular washer 27 made of rubber or other suitable material. In order to tighten the tubular member 8, holes 28, 28 are provided which are adapted to receive a spanner nut capable of being tightened by a wrench.

The valve block 25 is provided with a passageway 29 opening to the valve seat 21 and a second passageway 30 opening to a chamber 31. The chamber 31 communicates with passageway 29 when the rubber portion 20 of solenoid plunger 19 is unseated from valve seat 21. When the rubber member 20 of the solenoid plunger 19 is seated on valve seat 21, chamber 31 communicates with passageway 9. The inner end of passageway 30 is in communication with piston chamber 32 which is formed by means of a shell or housing 33 fastened at one end to the valve block 25 by means of screws 34 and at the other end to a closure member 35 by means of screws 36. A fluid tight seal is provided at opposite ends of the piston chamber by means of O-rings 37 and 38 made of rubber or other suitable material.

A piston guide member 39 is provided in the lower part of the piston chamber 32 and is adapted to receive a piston rod 40 on which is mounted a piston 41 which moves axially in piston chamber 32. An O-ring 42 made of rubber or other suitable material provides a fluid tight seal for the piston 41. The outer end of the guide member 39 is threadedly connected by means of threads 43 to a nipple 44 which is provided with a passageway 45 and a fitting 46. An annular washer 47 made of rubber, or other suitable material, is disposed between the member 35 and the nipple 44 to maintain a fluid tight seal.

The passageway 29 leads to fitting 48 which is connected to a tubular conduit 49 (Fig. 5). The fitting 13 is connected to a tubular conduit 50 (Fig. 5). The fitting 46 is connected to the tubular conduit 51 (Fig. 5).

A gas cylinder 52 is connected with a conduit 53 through a pressure regulator valve 54. The conduit 53 connects to conduit 51 and also to conduit 55. Conduits 51 and 55 are provided with pressure regulator valves 56 and 57, respectively. Conduit 55 connects with a storage reservoir or container 58 which contains syrup or other beverage ingredients adapted to be measured in the measuring and dispensing device.

A typical example of the operation of the measuring and dispensing device is as follows. Carbon dioxide maintained at a pressure of 800 to 1200 pounds per square inch in cylinder 52 is gasified and reduced to about 60 pounds pressure gauge by passing it through the regulator valve 54 into line 53. From line 53 the gaseous carbon dioxide passes into lines 51 and 55. In line 51 the pressure is further reduced to about 10 pounds per square inch gauge by pressure regulator valve 56. In line 55 the pressure is reduced to about 24 pounds per square inch gauge by pressure regulator valve 57.

The syrup container 58 is closed and the pressure of 24 pounds per square inch forces the syrup through line 50 from which it passes through nipple 13 into passageway 11. From passageway 11 the syrup proceeds through the bore 9 and the passageway 18 around the solenoid plunger or piston member 19 through chamber 31 and passageway 30 to measuring chamber 32. Inasmuch as the pressure of 24 pounds per square inch exerted against one side of piston 41 is greater than the pressure of 10 pounds per square inch exerted against the other side of piston 41, piston 41 is retracted until it is seated against the end of the spacer collar 39a in the position shown in Fig. 2 and the syrup occupies the measuring space 32.

When the solenoid coil 4 is energized by electrical energy through wires 5 and 6, solenoid member 19 is drawn toward the bore 9 and seats against valve seat 10 thereby closing the bore and cutting off the flow of syrup from the syrup container 58. At the same time the opposite end of the solenoid member 19 becomes unseated from the conical valve seat 21 thereby opening bore 29 to the atmosphere through conduit 49.

Inasmuch as the pressure on one side of piston 41 is now 10 pounds per square inch gauge and the pressure on the other side is reduced to atmospheric, the piston 41 moves toward the passageway 30 and positively displaces the syrup contained in the measuring chamber 32 through the passageway 30, the chamber 31, bore 29, nipple 48 and line 49. In ordinary practice the syrup in line 49 is passed through a cooling coil 59 as shown in Fig. 5 and discharged through an opening 60 into a cup, mixing chamber or other suitable receptacle where it is mixed, if desired, with another liquid such as water or carbonated water.

When the solenoid coil 4 is de-energized, spring 23 restores solenoid member 19 to its original position in which bore 9 is opened through passageways 18, 31 and 30 to measuring chamber 32. Simultaneously, solenoid member 19 seats against the conical valve seat 21 closing the bore 29 and cutting off the flow of syrup through line 49. The pressure within measuring chamber 32 changes from atmospheric pressure to the pressure of 24 pounds per square inch gauge as in the syrup container 58. This causes piston 41 to retract to the position shown in Fig. 2 and the syrup measuring chamber 32 is filled with syrup from the syrup container 58 in the manner previously described. In this manner a given quantity of syrup can be measured and dispensed repeatedly until the syrup container 58 is emptied.

In Fig. 6 a modification of the invention is illustrated whereby the measuring capacity of the syrup chamber 32 can be changed. This is accomplished by providing the piston guide member 39' with threads 43'. The distance which guide member 39' extends into the piston chamber can be regulated by adjusting nut 43'; for example, by loosening nut 43' and turning guide member 39' clockwise, the capacity of chamber 32' is enlarged. Nut 43' is then tightened in order to fix guide member 39' in the desired position. It will be understood that numerals 32', 33', 36', 38', 39', 40', 41', 42', 46' and 47' correspond, respectively, to numerals, 32, 33, 36, 38, 39, 40, 41, 42, 46 and 47, previously described with reference to Fig. 2.

It will be understood that the invention is susceptible to considerable modification and variation in the manner of its practical application. An essential feature of the invention is the provision of a measuring chamber adapted to hold a predetermined volume of liquid and a piston mounted for axial movement in said chamber in fluid-tight peripheral engagement with the inner walls thereof. One end of the piston forms one end of the measuring chamber. Means are provided for forcing a syrup or other beverage ingredient to be measured into the measuring chamber against the piston thereby causing the piston to be retracted or displaced a predetermined amount. Means are provided to cause positive movement of the piston in the opposite direction as soon as the pressure which initially caused the measuring chamber to be filled with syrup or other beverage ingredient is withdrawn or reduced. When the pressure which causes the measuring chamber to be filled is withdrawn or reduced to the point where it is less than the pressure on the opposite side of the piston, the latter moves in the opposite direction causing the syrup or other beverage ingredient to be displaced positively from the measuring chamber.

In the embodiment illustrated in the drawings, the movement of the piston in the measuring chamber is accomplished entirely by carbon dioxide pressure. The measuring chamber is filled due to the fact that the pressure on the storage reservoir is higher than the back pressure against which the piston operates. Just as soon as the pressure in the measuring chamber side of the piston is reduced to a point below the back pressure on the piston, the latter moves in the opposite direction and positively displaces the syrup from the measuring chamber.

The invention contemplates that the back pressure against which the piston moves when the measuring chamber is filled can be supplied by a spring or other suitable means rather than by gas pressure as in the embodiment illustrated in the drawings. The employment of gas pressure, however, has the advantage that the action of the piston is more positive and the operation of the device is not subject to changing characteristics such as occur with springs and other resilient mechanical devices.

The invention is especially advantageous in beverage vending machines where a carbonated drink is prepared and dispensed because such machines normally contain a carbon dioxide cylinder employed in making carbonated water for the beverage. The same gas cylinder therefore can be used to measure and dispense a measured quantity of syrup or other beverage ingredient.

The invention is not limited to a measuring and dispensing device for beverage vending machines. It can be used in other systems where it is desired to measure and dispense a given quantity of a fluid or flowable material. Nitrogen gas or any other source of non-toxic gas can be employed instead of carbon dioxide gas. For example, in a coffee making machine or in a machine for making a non-carbonated drink, other gases which are substantially insoluble in the material to be measured may be more desirable than carbon dioxide.

In the embodiment described in the drawings, the carbon dioxide pressure forces the syrup through the normally open port of a three-way solenoid valve to the piston in the metering cylinder and forces the piston against the lower carbon dioxide back pressure until it reaches a stop. When the solenoid valve is energized the normally open port of the three-way valve closes and the normally closed port opens. The opening of the normally closed port opens the discharge conduit to the atmosphere so that the back pressure is greater than the pressure in the metering cylinder and the syrup in the metering cylinder is discharged. When the solenoid valve is de-energized the normally open port is opened again and the normally closed port is closed allowing the metering chamber to re-fill. While a three-way solenoid valve has been used it should be understood that the system can be operated with two solenoid valves of the "on-off" type with the cylinder between them.

If the back pressure on the piston against which the chamber is filled is supplied by a spring or other resilient means a piston rod may not be absolutely essential and the piston can be called a diaphragm, but the general idea involved is the same. In both cases one side of the metering chamber retracts in response to the force exerted on the material which is being measured and is adapted to restore to its original position discharging said material from the chamber when said force is removed or reduced until it is overcome by the back pressure.

The manner in which the solenoid valve is energized is immaterial. A positive measuring syrup pump of the type described can be used in many types of electrically operated beverage machines. Such machines may or may not be supplied with coin actuated mechanisms. Many such machines have a push button electrical control. Where the syrup or other measured material is to be mixed with water, carbonated water or other liquid, the electrical controls operating through a push button control can be synchronized to dispense the measured material and mix it at a predetermined time with a predetermined amount of water, carbonated water or other liquid. The various means for accomplishing this are not described herein because they form no part of the invention.

The invention is especially valuable in beverage vending machines because it makes it possible to measure accurately a given amount of a beverage ingredient repeatedly. Many beverage machines have measuring devices in which a syrup is permitted to flow by gravity from a measuring chamber. Thick syrups sometimes tend to flow too slowly with the result that the drink obtained in the operation of such machines is not uniform. The device of the present invention, on the other hand, produces a positive displacement of the syrup so that a uniform amount of syrup is always used in preparing the drink. Moreover, the positive operation of the device reduces clogging and other difficulties which normally attend the measuring and dispensing of sticky syrups.

While no detailed description of complete beverage vending machines has been given herein, it will be understood that the invention is applicable to the modification of drink vending machines such as those described in U. S. Patents 2,261,338 and 2,376,403, the disclosures of which are incorporated herein by reference but the utility of the invention is by no means limited to these specific types of machines.

The invention is hereby claimed as follows:

1. A process of measuring and dispensing a measured amount of a flowable material which comprises forcing said flowable material into a measuring chamber one side of which is displaced to a predetermined position in response to the pressure exerted thereon by said material and against a gaseous back pressure smaller than said displacing pressure, and reducing said displacing pressure below said back pressure to cause said displaced side of said chamber to move in the reverse direction in response to said back pressure to dispense said material from said chamber.

2. A process of measuring and dispensing a measured amount of a flowable material which comprises forcing said flowable material into a measuring chamber one side of which is displaced to a predetermined position in response to gas pressure exerted on said material and against a back gas pressure smaller than said displacing pressure, and reducing said displacing gas pressure below said back gas pressure to cause said displaced side of said chamber to move in the reverse direction in response to said back gas pressure to dispense said material from said chamber.

3. In a beverage making machine, means comprising a storage container for a flowable beverage ingredient, a measuring chamber one side of which is displaceable to a predetermined position in response to pressure exerted thereon by a flowable beverage ingredient introduced into said chamber, means providing a gaseous back pressure against said side of said measuring chamber smaller than said displacing pressure, means connecting said storage container to said measuring chamber, a source of gas pressure, means connecting said source of gas pressure to said storage container to cause said beverage ingredient to flow to said measuring chamber under the influence of said gas pressure, and means for reducing said displacing pressure below said back pressure to cause said displaced side of said chamber to move in the reverse direction in response to said back pressure to dispense said material from said chamber.

4. In a beverage making machine, means comprising a syrup reservoir, a measuring chamber one side of which is displaced to a predetermined position in response to pressure exerted thereon, means connecting said chamber to said syrup reservoir, means for introducing gas pressure simultaneously to said syrup reservoir and the back of said side of said measuring chamber, means for maintaining the displacing gas pressure higher than the back pressure to cause the former to overcome the latter until the measuring chamber is full of syrup, and means for reducing the displacing gas pressure below the back pressure to cause the back pressure to discharge the syrup from the measuring chamber.

5. In an apparatus for measuring and dispensing a measured quantity of flowable material, a measuring cylinder provided with a measuring chamber adapted to hold a predetermined volume of said material, a piston mounted for axial movement in said cylinder in fluid-tight peripheral engagement with the inner walls of said cylinder and forming one end of said measuring chamber, means for introducing said material into said measuring chamber under pressure sufficient to cause said material to push said piston axially until said chamber contains a predetermined volume of said material, means for providing a gaseous back pressure on said piston during said introduction, and means for reducing said first mentioned pressure below said back pressure sufficiently to cause said piston to discharge the resultant measured volume of material from said measuring chamber under the influence of said gaseous back pressure.

6. In an apparatus for measuring and dispensing a measured quantity of syrup, a measuring cylinder provided with a measuring chamber adapted to hold a predetermined volume of syrup, a piston mounted for axial movement in said cylinder in fluid-tight peripheral engagement with the inner walls of said cylinder and forming one end of said measuring chamber, gas pressure means for introducing said syrup into said measuring chamber sufficient to displace said piston axially to a predetermined point, gas pressure means providing a back pressure on said piston less than said displacing pressure, and means for reducing said displacing pressure below said back pressure sufficiently to cause said piston to discharge said syrup from said measuring chamber.

7. A positive displacement measuring and dispensing device comprising a measuring cylinder provided with a measuring chamber adapted to hold a predetermined volume of material to be measured, a piston mounted for axial movement in said cylinder in fluid-tight peripheral engagement with the inner walls of said cylinder and forming one end of said measuring chamber, the opposite end of said measuring chamber being closed except for a passageway, and a three-way solenoid valve mounted on said cylinder and having a valve controlled port therein communicating with the passageway to said measuring chamber.

8. A positive displacement measuring and dispensing device comprising a measuring cylinder provided with a measuring chamber adapted to hold a predetermined volume of material to be measured, a piston mounted for axial movement in said cylinder in fluid-tight peripheral engagement with the inner walls of said cylinder and forming one end of said measuring chamber, the opposite end of said measuring chamber being closed except for a passageway, and a three-way solenoid valve mounted on said cylinder and having a valve controlled port therein communicating with said passageway to said measuring chamber, a second port communicating with said passageway and adapted to be connected to a source of material to be measured, and a third port connected to said passageway and adapted to serve as a discharge port, said second and third ports being alternately opened and closed by the operation of said solenoid valve.

9. A positive displacement measuring and dispensing device comprising a measuring cylinder provided with a measuring chamber adapted to hold a predetermined volume of material to be measured, a piston mounted for axial movement in said cylinder in fluid-tight peripheral engagement with the inner walls of said cylinder and forming one end of said measuring chamber, the opposite end of said measuring chamber being closed except for a passageway, means to introduce gas pressure back of said piston, and a three-way solenoid valve mounted on said cylinder and having a valve controlled port therein communicating with said passageway to said measuring chamber, a second port communicating with said passageway and adapted to be connected to a source of material to be measured, and a third port connected to said passageway and adapted to serve as a discharge port, said second and third ports being alternately opened and closed by the operation of said solenoid valve.

References Cited in the file of this patent

UNITED STATES PATENTS

| | | |
|---|---|---|
| 507,316 | Fowler | Oct. 24, 1893 |
| 1,299,001 | Moore | Apr. 1, 1919 |
| 2,440,365 | Copping et al. | Apr. 27, 1948 |
| 2,521,177 | Le Clair | Sept. 5, 1950 |
| 2,569,751 | Dube et al. | Oct. 2, 1951 |
| 2,657,673 | Littlefield | Nov. 3, 1953 |